Jan. 28, 1964 B. J. WARMAN ETAL 3,119,902
TELEPHONE SELECTOR SYSTEMS
Filed Aug. 11, 1959
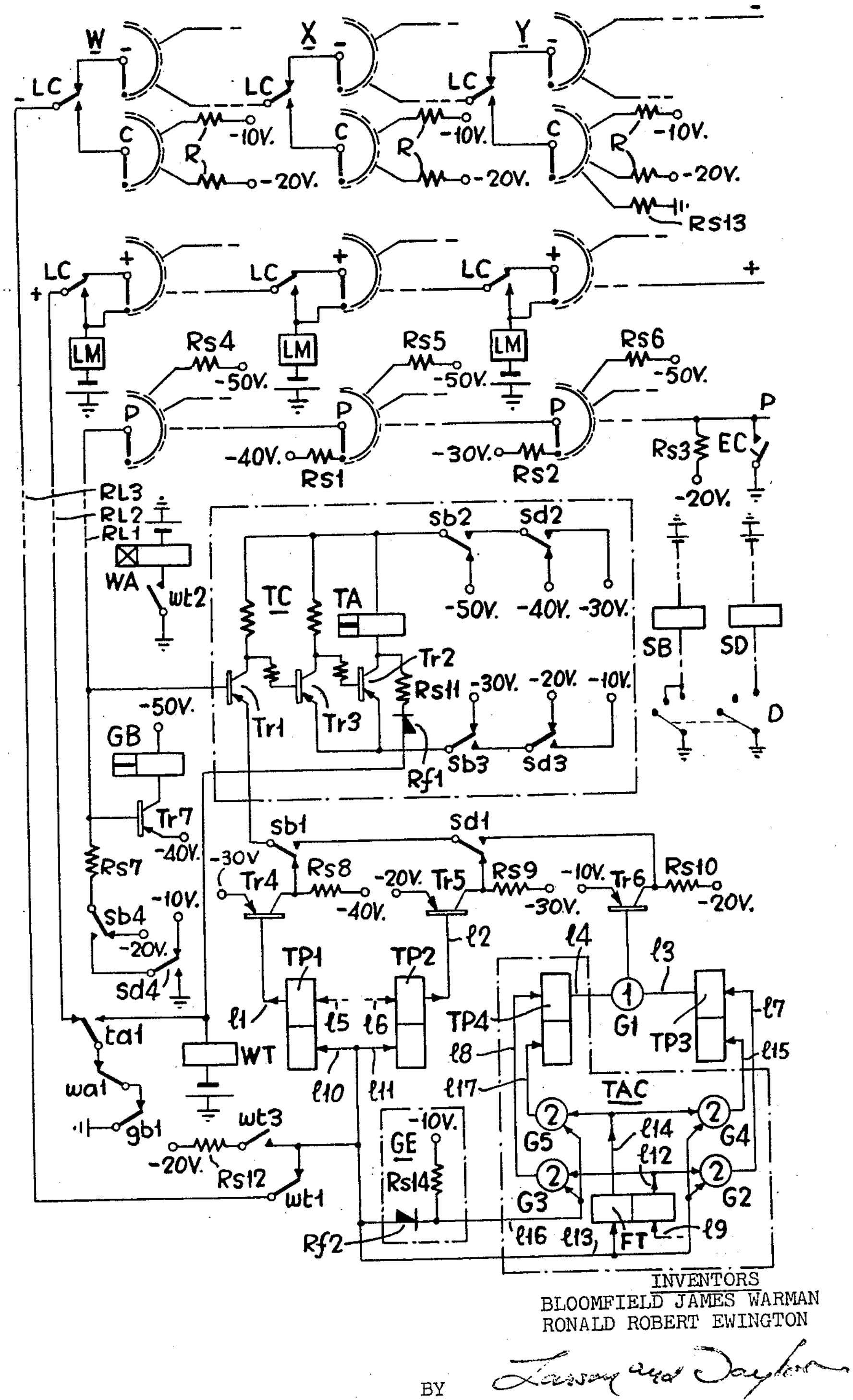
INVENTORS
BLOOMFIELD JAMES WARMAN
RONALD ROBERT EWINGTON
BY Larson and Taylor United States Patent Office 3,119,902

Patented Jan. 28, 1964

3,119,902

TELEPHONE SELECTOR SYSTEMS

Bloomfield James Warman, Charlton, London, and Ronald Robert Ewington, Seven Kings, Ilford, England, assignors to Associated Electrical Industries (Woolrich) Limited, London, England, a company of Great Britain Filed Aug. 11, 1959, Ser. No. 833,019
Claims priority, application Great Britain Aug. 15, 1958
10 Claims. (Cl. 179—18)

This invention relates to selector systems such as are employed, for example, in automatic telephone exchanges for outlet selection. In particular, the invention is concerned with so-called testing circuits in which as a setting selector, that is, one in the process of being set, scans each of a number of outlets in turn, so each of a corresponding number of test terminals, each held at a potential within a given range of values when its appertaining outlet is free and at another potential when the outlet is busy, are connected in turn, synchronously with the scanning action, to a test point having connected or connectible thereto a potential responsive device which is effective in response to receipt of a test terminal potential within said range to cause the selector to seize the outlet thereby indicated as being free. For a multi-stage selector system in which a first stage selector effects selection of an outlet leading to a free second stage selector (as in the case of first and second group selectors, or of a final selector and preceding group selector, in an automatic telephone exchange) such a testing circuit would normally be provided for each selector stage.

Such testing circuits are usually required to mark the relevant test terminal as busy (that is, change its potential to the busy value) when an outlet is seized by a selector under its control, and where two or more selectors can scan the same group of outlets it is obviously desirable that the busy marking shall be effected with a minimum of delay in order to prevent seizure of the same outlet by another selector. Also where separate testing circuits are provided for the outlets of different stages in a multi-stage selector system, it is sometimes required that the potential responsive device in the testing circuit provided for one selector stage shall not respond to the "free" test terminal potential of outlets in a subsequent stage. This latter requirement is necessary in certain multi-stage systems in which, in some circumstances, the test terminal potential in a later stage is liable to be fed back and to appear momentarily at an outlet of an earlier stage, with possible incorrect functioning in that, instead of a selector seizing an outlet to which a free selector in the next stage is connected, it will seize one to which a free selector in the next but one stage is effectively connected through an off-normal selector of said next stage.

In a particular kind of testing circuit which has been proposed to meet the above requirements and which functions with each test terminal in the appertaining selector stage held at a distinctive potential when the corresponding outlet is free, a potential responsive device connected to a test point to which the test terminals are effectively coupled in turn (which test point may for instance be a wiper of the setting selector controlled by the circuit) serves in effect to compare the test terminal potentials with a reference potential having a predetermined value. This value is so related to the "free" potential which appears at the test point from a test terminal pertaining to a free outlet that on such "free" potential appearing there, the device referred to responds and causes the operation of a control element which thereupon causes the scanning action of the selector to be stopped at such outlet. In this particular kind of testing circuit there is also included, in order to provide an effective "busy" marking on the test terminal for an outlet seized by the selector, one or more resistances across which, upon response of the potential responsive device, a change of potential difference takes place which establishes, at the test terminal at which the scanning action is then stopped, a potential of such value that the potential responsive device of another, similar, testing circuit associated with a different selector and testing the same terminals, is unable to respond and is thereby prevented from stopping its selector at the same outlet.

It is contemplated that in using the above kind of testing circuit in a multi-stage selector system, the previously discussed possibility of incorrect testing-in would be guarded against by arranging that the outlets leading from a first stage selector to second stage selectors have their test terminals marked, when the appertaining outlets are free, with a distinctive "free" potential different from that appearing at the test terminals for free outlets of a second stage selector: the reference potential employed for the testing circuit which controls outlet selection in the first stage is then so chosen that the "free" potential of the second stage test terminals cannot cause response of the potential responsive device in the first stage testing circuit.

It was previously envisaged that with the foregoing arrangement a separate testing circuit would be provided for each selector stage in a multi-stage system, each such circuit having a different reference potential for its potential responsive device and being switched into use when the selector of the stage to which it relates is setting. It is an object of the present invention to eliminate the need for a plurality of testing circuits in such circumstances and to enable a single testing circuit to be used while giving the same facilities.

According to the invention there is provided in a multi-stage selector system having different "free" test terminal potentials relevant to the successive stages, a single testing circuit arranged for controlling outlet selection in the successive stages and having associated therewith in respect of each selector stage, a switching circuit which, when a particular outlet or group of outlets is reached by a setting selector in the relevant stage, is operable to apply to a potential responsive device of the testing circuit a reference potential which, having a different value for each stage, is effective to permit response of said device only on receipt from the setting selector of the relevant "free" test terminal potential, said device being effective to stop the selector on so responding.

To distinguish between ordinary and P.B.X (private branch exchange) groups of lines, it is contemplated that in carrying out the invention two switching circuits may be provided in respect of a final selector stage for controlling the application to the testing circuit of the reference potential appropriate to that stage, one of these switching circuits being effective for ordinary working and one for P.B.X working, test terminal potentials identifying the beginning and end of a P.B.X group of lines being so chosen that they alone can cause operation of the switching circuit provided for P.B.X working.

The nature of the invention may be more fully understood from the following description, given with reference to the single figure of the accompanying drawing, of a specific embodiment thereof as applied to an automatic telephone exchange having first and second group selector stages and a final selector stage.

For the purposes of this description, it is assumed that the exchange is of the kind in which the group and final selectors are of the high-speed motor-driven uniselector type and are controlled in their selecting and setting operations by means of common registering and controlling circuits (hereinafter referred to as registers) in accordance with digits, for example dialled digits previously received by and stored in the registers, impulses reverted by the selectors during their setting operations being received by the registers and compared with the stored digits in order to determine when the selectors have reached an appropriate outlet or group of outlets. Automatic telephone exchanges of this kind, in which the selectors are usually restored to normal after use by means of "homing" circuits which periodically search the selector ranks and restore to normal any free selectors encountered which are not resting on their home contacts, are well known and need not be described in more detail here since they do not themselves constitute any part of the invention; any further reference to their operation which is necessary in the following description of the invention will consequently be in outline only.

On the drawing and in the description, certain specific voltages are mentioned: it is to be understood that these are given by way of example only and that in practice other values may be used according to circuit requirements.

Referring to the drawing, a first group selector, a second group selector, and a final selector of the exchange are respectively represented in conventional manner by the three groups of arcs W, X and Y and are each representative of a number of multiplied selectors in the same switching stage.

The (−) and (+) arcs in each selector represent the contact arcs constituting the selector outlets to which the usual (−) and (+) wires of the communication channels through the exchange are connected; the (P) arc in each selector represents a test contact arc to which the private or P-wires respectively associated with the communication channels are connected, the contacts of this arc constituting the previously referred to test terminals of the selector; and the (C) arc in each selector represents the contact arc to which potentials are connected to provide, in known manner, the impulses which are reverted to a controlling register during a setting action of the selector, these potentials being so connected that for first and second group selectors W and X an impulse is reverted at the beginning and end of each group of outlets leading to the next selector stage (a single impulse serving to define both the end of one group and the beginning of the next group) and that for final selectors Y an impulse is reverted at every outlet. The reverted impulses are always alternately of decreasing and increasing negative polarity, being obtained from −10 volts and −20 volts sources over resistances such as those designated by the letter R, except for those from a final selector Y which pertains to the beginning and the end of a P.B.X group of outlets, these latter impulses being obtained from an earth connection over a resistance such as Rs13.

Each selector has an individual latch electromagnet LM which, in addition to controlling the operation of the selector in known manner, controls also two changeover latch contacts LC which in their unoperated positions afford connection to wipers of the (−) and (+) arcs of the selector and in their operated positions afford connection on the one hand to the wiper of the (C) arc to complete a circuit for reverting impulses from the selector to a register, and on the other hand to the latch electromagnet LM of the selector to complete an energizing circuit therefor from the register. The latch electromagnet LM is also connected to the home contact of the (+) arc of its selector.

Each second group selector X, when at rest in its normal, or home, position, has its test contact wiper, that is the wiper associated with the test contact arc (P), connected to a −40 volts source over the home contact of the P-arc and a testing resistance Rs1; each final selector Y, when at rest in its normal, or home, position, has its test contact wiper connected to a −30 volt source over the home contact of the P-arc and a testing resistance Rs2; and the private (P) wire of each of the lines connected to the outlets of each final selector Y is connected through a testing resistance Rs3 to a −20 volts source. Thus the "free" test terminal potential for the first group selector stage is obtained from the −40 volts source of free second group selectors, that for the second group selector stage X is obtained from the −30 volts source of free final selectors, and that for a final selector stage Y is obtained from the −20 volts source of free lines. In consequence, when a first group selector W is off-normal, that is, its wipers are engaging some contact in their respective contact arcs other than the home contact, its private (P) wiper (which will be taken as being the test point previously referred to) may be connected by way of the relevant testing resistance to one of the following voltage potentials:

−40 volts if the contact which the test contact wiper is engaging is connected to the test contact wiper of a second group selector X which is in its normal position;

−30 volts if the contact which the test contact wiper is engaging is connected to the test contact wiper of a second group selector X which is off-normal and whose test contact wiper is connected through a contact to the test contact wiper of a final selector Y which is in its normal position; or −20 volts if the contact which the test contact wiper is engaging is connected to the test contact wiper of a second group selector X which is off-normal and whose test contact wiper is connected through a contact to the contact wiper of a final selector Y which is also off-normal but not engaged in a call, that is, a final selector Y which is engaging outlets connected to a free line.

The test contact wiper of an off-normal first group selector W may also be connected to either of two "busy" voltage potentials, namely, −50 volts extended from a −50 volt source which is connected through a resistance Rs4, Rs5 or Rs6 to the penultimate contact in the (P) arc of a first group selector W, a second group selector X, or final selector Y respectively, a selector being rotated to its penultimate outlet after failing to test-in to a required outlet or group of outlets, or a voltage potential having a value between −10 volts and earth if a final selector Y is engaging the outlets of a busy line, the actual value depending on whether the line is engaged in a call or whether it is a called or calling line. For the sake of convenience in the present instance the value of the voltage potential for any of these possible busy line conditions will be assumed to be earth, this earth being connectible to the private (P) wire of the line by closure of busying relay contacts EC in the usual manner.

Before a register which is engaged in the setting up of a connection between two exchange lines can permit a selector taken into use by it to select an outlet appropriate to the connection it must first ascertain that the outlet is free. To this end the register includes in accordance with the invention a single testing circuit TC which is effective to detect and respond to a "free" test terminal potential of an outlet in either the first group selector stage W, or the second group selector stage X, or the final selector stage Y, according as reference potentials appropriate to these stages are applied to the testing circuit TC. In addition, the testing circuit TC is effective, in conjunction with additional circuitry TAC in the register, to discriminate between final selector outlets for ordinary lines and P.B.X lines, so that in consequence the control and setting of a final selector to an ordinary line, and also the control of a final selector while it searches a group of P.B.X lines and its subsequent setting to a free line encountered in the group, is effected directly from the register.

The testing circuit TC comprises as its potential responsive device a transistor Tr1 having its base connected, at least when the testing circuit TC is brought into use, over a register coupling connection represented by the dotted lines RL1 to the test contact wiper of the P-arc of a first group selector W. It is appreciated that transistors are now usually recognised as being current responsive devices, but since in the present instance, as will appear hereinafter, the transistor Tr1 is arranged to be rendered conductive by the selective application of different potentials between its base and emitter, the term "potential responsive device" as applied to this transistor is not considered to be inappropriate. The testing circuit TC also includes as a control element, a high-speed test relay TA of the kind generally employed for high-speed motor-driven uniselectors. This relay TA is connected so as to be operated when the transistor Tr1 becomes conductive, the energizing winding of the relay TA, to this end, being connected either directly in the collector circuit of the transistor Tr1 or, in a preferred alternative as shown in the drawing, in the collector circuit of another transistor Tr2 which is cascade-connected through yet another transistor Tr3, to the transistor Tr1.

The reference potential appropriate to the first group selector stage W is obtained from the collector of a first reference-potential transistor Tr4 which is rendered conductive to produce the reference potential in response to an operating signal applied to its base over an output lead *l*1 from a switching circuit TP1. Similarly, the reference potential appropriate to the second group selector stage X is obtained from the collector of a second reference-potential transistor Tr5 which is rendered conductive to produce the reference potential in response to an operating signal applied to its base over an output lead *l*2 from a switching circuit TP2. The reference potential appropriate to the final selector stage Y is also obtained from the collector of a third reference-potential transistor Tr6 which produces the reference potential in its conductive condition, but in this instance the transistor Tr6 is rendered conductive in response to an operating signal applied to its base, by way of a so-called "or" gate circuit G1, either over an output lead *l*3 from a switching circuit TP3 provided in respect of ordinary final selector working, or over an output lead *l*4 from a switching circuit TP4 provided in respect of P.B.X final selector working in the additional circuitry TAC.

According to the particular stage selector which may be setting under the control of the register at any time, the collector of one or another of the reference-potential transistors Tr4, Tr5 and Tr6 is connected by means of changeover contacts *sb*1 and *sd*1 of two potential-switching relays SB and SD to the emitter of the testing circuit transistor Tr1. To this end the relays SB and SD are operable by a distributor which, after a selector in one stage has been set by the register, effects a switching action by which the register is prepared to control the setting of a selector in the next stage. Modes of organization and operation of the register and distributor in these respects are known in the art and need not be considered in detail here. It is also thought that the manner in which the relays SB and SD can be operated by the same switching action is sufficiently self-evident not to need detailed description here. By way of illustration, however, part of the distributor has been represented by a multi-position switch D: during setting of a first group selector W this switch D has the position shown; for the setting of a second group selector X the switch occupies its second position, in which relay SB is operated; and for the setting of a final selector Y the switch occupies its third position in which both the relays SB and SD are operated.

The switching circuits TP1, TP2, TP3 and TP4, represented functionally in the drawing in conventional manner, are preferably bi-stable electronic circuits employing transistors, such circuits being in themselves well-known. Each of the switching circuits TP1 and TP2 functions to produce an operating signal therefrom, on the output lead *l*1 or *l*2 as the case may be, in response to a stimulus which is applied to it over a control connection, *l*5 or *l*6, when the number of impulses reverted to the register from a setting first or second group selector indicates that the selector has reached an appropriate group of outlets. In the case of the switching circuits TP3 and TP4 associated with the final selector stage, however, each of these functions to produce an operating signal, on the output lead *l*3 or *l*4, in response to a stimulus which is applied to it over an input lead, *l*7 or *l*8, from a further, priming, switching circuit FT, which may be similar to the switching circuits TP1 . . . TP4 and receives over an input lead *l*9 a stimulus applied to it by the register at a time and with an effect which will be considered later in this specification.

In accordance with the particular reference potential applied at any time to the emitter of the transistor Tr1 by the changeover contacts *sb*1 and *sd*1, the potential-switching relays SB and SD also control, respective changeover contacts *sb*2 and *sd*2 by which the potential at the collector of each of the testing circuit transistors Tr1, Tr2 and Tr3 is appropriately varied, respective changeover contacts *sb*3 and *sd*3 by which the potential at the emitter of each of the transistors Tr2 and Tr3 is appropriately varied, and respective changeover contacts *sb*4 and *sd*4 by which a —20 volts source, a —10 volts source, or earth is connected by way of a resistance, Rs7, which is effectively included in the testing circuit TC in respect of its utilisation, to the base of the transistor Tr1, this resistance Rs7, in conjunction with the relevant testing resistance Rs1, Rs2 or Rs3, producing at the base of the transistor Tr1 the appropriate "free" test terminal potential for a selector stage. The resistance Rs7 also prevents two selectors from testing into the same outlet by reason that when a selector has seized an outlet under the control of the testing circuit TC and a second setting selector having a similar testing circuit associated with it also engages that outlet, the resistance Rs7 co-operates with the corresponding resistance in said similar testing circuit to produce a potential-dividing action effective on the test terminal potential for that for preventing the potential-responsive device (corresponding to the transistor Tr1) in the second testing circuit from responding thereto to stop the second selector.

The collectors of the reference-potential transistors Tr4, Tr5 and Tr6 are connected through individual resistances Rs8, Rs9 and Rs10 to sources of —40 volts, —30 volts and —20 volts respectively, which correspond to the voltages of the sources from which the "free" test terminal potentials of outlets of the successive selector stages are derived; the emitters of these transistors are connected respectively to sources of —30 volts, —20 volts and —10 volts. In consequence, when a reference-potential transistor is conductive, the reference potential provided thereby at its collector is less negative than the "free" test terminal potential of an outlet of the appertaining selector stage but more positive than the "free" test terminal potential of an outlet of the next selector stage: for instance, as regards transistor Tr4 pertaining to the first selector stage, the potential at the collector of this transistor when fully conducting is somewhat more negative than —30 volts as compared with the —40 volts "free" test terminal potential of outlets of the first stage selectors W and the —30 volts "free" test terminal potential of outlets of the second stage selectors X. As a result, the potential responsive transistor Tr1 in the testing circuit TC will respond only to a "free" test terminal potential from a particular selector stage as determined by the particular reference potential applied to the transistor at any time, and not to any "free" test terminal potenial extended from a succeeding selector stage. It will be apparent, therefore, that the "free" test terminal potentials of outlets, and correspondingly the reference potentials, for the several selector stages are graded in magnitude over the stages. It is to be appreciated, however, that the particular potential grading given is only exemplary, other potential values being able to be employed if desired.

In operation, a first group selector W taken into use by the register for the setting up of a call is progressed in its setting movement until the number of impulses reverted to the register from the selector "C" arc over a register coupling connection represented by the dotted lines RL3, indicates that the selector has reached the group of outlets which, as identified by the relevant registered digit, can effect the required connection to the second group selector stage X. For this setting action a circuit for energizing the selector latch electromagnet LM is completed to earth in the register by way of latch contact LC, a register coupling connection RL2, a changeover contact *ta*1 (unoperated) of the test relay TA, a break contact *wa*1 (unoperated) of a slow-operating switching relay WA, and a break contact *gb*1 (unoperated) of a high-speed busying relay GB. During this setting movement the wiper of the (P) arc of the selector is connected by way of the register coupling connection RL1 to the base of the transistor T*r*1 in the testing circuit TC, but the reference potential required to be applied to the emitter of this transistor before it can respond to the "free" test terminal potential of an outlet connected to a free second group selector X is not initially present because the transistor T*r*4 is non-conductive. However, upon the required group of outlets being reached, as indicated by the number of reverted impulses, the register causes a stimulus to be applied over the control connection *l*5 to the switching circuit TP1, which in response thereto functions to apply over the lead *l*1 an operating signal to the base of the transistor T*r*4. The transistor T*r*4 is thus rendered conductive and the reference potential produced at its collector is applied by way of the changeover contact *sb*1 (unoperated) to the emitter of the transistor T*r*1 to enable the latter thereafter to be rendered conductive by a "free" test terminal potential pertaining to a free second group selector X and appearing at the relevant test contact outlet in the first group selector W. Consequently, when the P-arc wiper of the searching first group selector, now scanning the required group, encounters such a potential at a contact of its (P) arc, the transistor T*r*1 is rendered conductive by such potential received at its base over lead RL1. The consequent operation of the test relay TA causes its changeover contact *ta*1 to break the previously traced energizing circuit for the latch electromagnet LM of the first group selector W, thereby causing this selector to be stopped on this free outlet to the second group selector stage X.

If all the outlets of the required group are busy, the scanning first group selector W continues in its movement until it reaches the end of the group. When it does so, the impulse then reverted to the register from the (C) arc is applied by way of a break contact *wt*1 (unoperated) of a switching relay WT, to a resetting lead *l*10 of the switching circuit TP1, which is thereby restored to normal and terminates the operating signal which it applied to the transistor T*r*4: this in turn causes the transistor T*r*4 to cease conducting and so remove the reference potential for the first group selector stage from the emitter of the transistor T*r*1. The first group selector continues its rotation (any "free" test terminal potentials which it encounters being now ineffectual) and reaches its penultimate outlet at which the contact of the (P) arc is connected through the resistance R*s*4 to the "busy" potential of $-50$ volts. This potential, applied over the connection RL1, appears at the base of transistor T*r*1, on which it has no effect, and also at the base of a transistor T*r*7 which has the busying relay GB connected for operation in its collector circuit. The emitter of the transistor T*r*7 is connected to a $-40$ volts potential, thereby enabling this transistor to be rendered conductive by the $-50$ volts "busy" potential but not by any of the "free" test terminal potentials which can appear on the connection RL1. When the busying relay GB operates, consequent on the transistor T*r*7 being rendered conductive, the break contact *gb*1 breaks the energizing circuit for the first group selector latch electromagnet LM and so brings the selector to rest on its penultimate outlet, while further contacts thereof (not shown) may cause a busy signal to be returned to the calling line concerned. The first group selector W then remains on its penultimate outlet until it is restored to normal.

Assuming, however, that the scanning first group selector W finds a free outlet to a second group selector X, then after the latch contacts LC of the first group selector W are released on the de-energization of its latch electromagnet LM, the energizing circuit used for setting the first group selector is extended through the seized outlet of the (+) arc of this latter selector to the latch electromagnet LM of the free second group selector X connected to that outlet. This energizing circuit is re-established in the register in the following manner:

When the test relay TA in the testing circuit TC operates to disconnect the energizing circuit for the latch electromagnet LM of the first group selector W, operation of the changeover contact *ta*1 diverts the earth behind the break contact *gb*1 to complete, on the one hand, a temporary holding circuit for the test relay TA by way of a rectifier R*f*1 and a resistance R*s*11 and, on the other hand, an operating circuit for the switching relay WT. When the relay WT operates its make contact *wt*2 completes an operating circuit for the slow-operating switching relay WA, and its make contact *wt*3 applies a $-20$ volts potential behind a resistance R*s*12 to the lead *l*10, thereby to restore the switching circuit TP1 to normal and thus terminate the operating signal therefrom. This in turn causes the transistor T*r*4 to cease conducting and to remove from the emitter of the transistor T*r*1 the reference potential for the first group selector stage. After the operating lag of the relay WA, its break contact *wa*1 opens to release the switching relay WT and to break the temporary holding circuit of the test relay TA. The contact *wt*2 of the relay WT, on opening, causes the release of the relay WA, which, at its break contact *wa*1, re-establishes the latch electromagnet energizing circuit over contact *ta*1 (now normal). This energizing circuit is therefore again extended over the register coupling connection RL1 towards the selectors, this time to energize the latch electromagnet LM of the second group selector X. The temporary holding circuit for the test relay TA is necessary in order to ensure that the latch contact LC of the first group selector W is released to extend the (+) wire forward to the latch electromagnet LM of the chosen second group selector before the latch electromagnet energizing circuit is re-established.

A search for an outlet included in a required group and leading to a free final selector Y is now effected by the second group selector X in a manner generally similar to that described for the first group selector W, but this time when the required group of outlets in the second group selector X is reached, the register causes a stimulus to be applied over the control connection *l*6 to the switching circuit TP2, which in response to such stimulus functions to apply over the lead *l*2 an operating signal to the base of the transistor T*r*5. Prior to this latter search the distributor D in the register has effected operation of the potential-switching relay SB and therefore the emitter of the transistor T*r*1 is now connected through the operated contact *sb*1 to the collector of the transistor T*r*5. As a result, the conduction of the transistor T*r*5 in response to the operating signal applied thereto causes the reference potential for the second group selector stage to be applied to the emitter of the transistor T*r*1. When a free second group selector outlet has been found and the latch electromagnet energizing circuit has been interrupted by the changeover contact *ta*1 of the test relay in the same manner as for the first group selector W, then after release of the latch contacts LC of the second group selector X the register once more extends this energizing circuit towards the selectors, being extended this time to the chosen final selector Y by waby of the (+) wipers of the positioned first and second group selectors W and X. Where a free outlet is thus found, the switching circuit TP2 is restored to normal by application thereto over contact $wt3$ and lead $l11$ of the —20 volts potential behind the resistance $Rs12$. Should no final selector be available, the switching circuit TP2 is restored to normal by the application thereto over the lead $l11$ of the next impulse reverted to the register over connection RL3, the busying relay GB functioning as before to stop the second group selector X on its penultimate outlet and to return a busy signal to the calling line concerned.

Considering now the setting of a selected free final selector Y to an ordinary final selector outlet, the operations within the register are such that when the final selector reaches the outlet immediately preceding the required outlet, as determined by the number of reverted impulses compared with the relevant registered digit, a stimulus is applied over the control connection $l9$ to the switching circuit FT in the additional register circuitry TAC. In response to this timulus, the switching circuit FT functions to produce on an output lead $l12$ a priming signal for each of two coincidence-of-two gate circuits G2 and G3. The next reverted impulse received over the register coupling connection RL3 from the (C) arc of the still rotating final selector Y, which impulse is the one pertaining to the required outlet, is applied by way of the contact $wt1$ (unoperated) and a lead $l13$ as an opening signal for the gate G2, which thereupon opens to apply over the lead $l7$ a stimulus to the switching circuit TP3. Prior to the commencement of the final selector setting action the distributor D in the register has effected operation of the potential-switching relay SD in addition to relay SB. The emitter of the testing circuit transistor $Tr1$ is therefore connected through the operated contact $sb1$ and the operated contact $sd1$ to the collector of the transistor $Tr6$. In consequence the switching circuit TP3 functions in response to the stimulus applied thereto to produce an operating signal which causes the conduction of the transistor $Tr6$ and thereby brings about the application to the emitter of the transistor $Tr1$ of the reference potential for the final selector stage.

If the required final selector outlet which has now been reached is free, the test relay TA operates as before to break the emergizing circuit to the final selector latch electromagnet LM and thereby stop the selector.

The reverted pulse pertaining to the required outlet is also applied as a restoring signal over the lead $l13$ to restore the switching circuit FT to normal, but not before the switching circuit TP3 has had a chance to operate. In its restored condition the switching circuit FT applies a priming signal over a lead $l14$ to each of two further coincidence-of-two gate circuits G4 and G5. If the required outlet is not free, so that the final selector Y is not stopped at it, the next impulse reverted over the register coupling connection RL3 from the (C) arc of the final selector is applied as an opening signal by way of the lead $l13$ to the gate circuit G4, which opens to produce on a lead $l15$ a restoring stimulus for the switching circuit TP3. The conduction of transistor $Tr6$ is therefore stopped, and with the reference potential for the final selector stage thus removed from the emitter of the transistor $Tr1$ the final selector Y rotates to its penultimate outlet where is is stopped as before by the busying relay GB.

In the case of P.B.X working, the reference potential for the final selector stage is applied to the emitter of the transistor $Tr1$, as for ordinary working, on the first outlet of the P.B.X group. However, the reverted impulse pertaining to the first outlet of a P.B.X group is derived, as aforesaid, from earth potential connected behind the resistance $Rs13$ (instead of from a —10 volts or —20 volts potential as for the group selectors and for ordinary lines on the final selectors). The reverted pulse for a P.B.X group is therefore such that not only is it applied by way of the lead $l13$ to the gate circuit G2 to bring about, in conjunction with the stimulus from the switching from the switching circuit FT, the operation of the switching circuit TP3, but also it is applied, by way of a discriminating gate circuit GE and lead $l16$, as an opening signal for the two coincidence-of-two gate circuits G3 and G5. The discriminating action of the gate circuit GE, constituted by a rectifier $Rf2$ and resistance $Rs14$, is afforded by a —10 volts potential which is connected to the resistance $Rs14$ and acts to back-off the rectifier $Rf2$ in respect of all the reverted impulses other than that obtained from a final selector Y at the beginning of a P.B.X group. As aforesaid, the priming stimulus from the priming circuit FT is also applied by way of the lead $l12$ to the gate circuit G3, which therefore opens in response to the reverted impulse pertaining to first outlet of the P.B.X group to produce on the lead $l8$ an operating stimulus for the switching circuit TP4. This switching circuit TP4 is operable independently of the switching circuit TP3 to apply to the base of the reference-potential transistor $Tr6$ an operating signal which causes this transistor to conduct to produce the reference potential for the final selector stage. With intermediate outlets of a P.B.X group reverting impulses corresponding to those for ordinary outlets, and with the last outlet of a P.B.X group reverting an impulse corresponding to that of the first outlet of the group, the switching circuit TP4 will not be affected by the impulses from the intermediate outlets because these cannot pass through the discriminating gate GE. The reference potential for the final selector stage therefore remains applied to the transistor $Tr1$, irrespective of the condition of the switching circuit TP3, until if all the P.B.X lines are busy the reverted impulse from the last outlet of the group passes through the discriminating gate circuit GE and is applied to the gate circuit G5. This gate circuit G5 would previously have been primed over the lead $l14$ by restoration of the priming circuit FT in response to the reverted impulse from the second outlet of the P.B.X group, and thus the gate circuit G5 opens to produce on a lead $l17$ a restoring signal for the switching circuit TP4, which responds thereto to terminate the application of the reference potential for the final selector stage to the emitter of the transistor $Tr1$. The setting condition is thus once again terminated and the final selector Y rotates to the penultimate outlet with subsequent operations as for an ordinary busy line. If, on the other hand, a free line within the P.B.X group being searched by the final selector Y is found, the selector is stopped on the free line in consequence of the operation of the test relay TA as before.

What we claim is:

1. In a multi-stage selector system having different free test terminal potentials relevant to the several selector stages, an arrangement for controlling the setting of selectors in the several stages to required free outlets, said arrangement comprising a single testing circuit which includes a potential responsive device and is connected to receive the test terminal potentials, a plurality of switching circuits pertaining respectively to the several selector stages, each such switching circuit having a control connection over which it can be operated when a setting selector in the stage to which it pertains reaches a particular outlet, and means responsive to operation of such switching circuit for applying to the potential responsive device of the testing circuit a reference potential which, having a different value for each selector stage, is of such value as to permit said device to respond only to the free test terminal potential of the relevant stage, said device being effective to stop the selector on so responding.

2. A testing circuit arrangement as claimed in claim 1, wherein the testing circuit comprises as its potential-responsive device a transistor having its base-emitter circuit connected, at least when the testing circuit is brought into use, between a test contact wiper of a first stage selector and a point to which the reference potentials appropriate to the successive selector stages are connectible in turn under control of the relevant switching circuits.

3. A testing circuit arrangement as claimed in claim 2, wherein the reference potential for each selector stage is obtained from the emitter-collector circuit of an individual transistor controlled by the revelant switching circuit between a conductive state and a substantially non-conductive state.

4. A testing circuit arrangement as claimed in claim 1 for a multi-stage selector system in which each selector has a test contact wiper and an associated test contact arc the contacts of which constitute the test terminals and are each connected in each but the last stage to a test contact wiper of a selector in the next stage, said arrangement including an individual reference potential transistor in respect of each selector stage, a further transistor constituting the potential responsive device of the testing circuit, this further transistor having its base connected, at least when the testing circuit is brought into use, to the test contact wiper of a first stage selector, change-over means by which the emitter of said further transistor is selectively connectible to the collectors of the several reference potential transistors in turn, and a potential switching device controlling said change-over means and operable in the interval between the end of a selector setting action in one stage and the commencement of ensuing selector setting action in the next stage.

5. A testing circuit arrangement as claimed in claim 1, wherein the testing circuit includes a resistance which, when a selector has seized an outlet and a second setting selector having a similar testing circuit associated with it also engages that outlet, cooperates with the corresponding resistance in said similar testing circuit to produce a potential dividing action effective on the test terminal potential for that outlet for preventing the potential-responsive device in the second testing circuit from responding thereto to stop the second selector.

6. A testing circuit arrangement as claimed in claim 5, wherein said resistance is connected between the base of the transistor functioning as the potential-responsive device and a point the potential of which is selectively determined according to the selector stage being dealt with at any time.

7. A testing circuit arrangement as claimed in claim 1, comprising two switching circuits for a final selector stage, one of said switching circuits being in respect of ordinary lines and the other being in respect of private branch exchange lines connected to the final selector stage, the arrangement further including a priming circuit which is connected for operation in one sense when a setting final selector reaches the outlet immediately preceding the outlet of a required ordinary line or the first outlet of a required private branch exchange group of lines, as the case may be, to prime for operation both of said two switching circuits, and is connected for operation in opposite sense when the next outlet is reached by the final selector to prime for restoration both these switching circuits, the two primed switching circuits being independently operable when the said next outlet is reached, according as such outlet pertains to an ordinary line or to a private branch exchange line, for applying to the potential-responsive device of the testing circuit the reference potential appropriate to the final selector stage and being subsequently independently restorable for terminating the reference potential.

8. A testing circuit arrangement as claimed in claim 7 including also a discriminating gate circuit for inhibiting restoration of the switching circuit pertaining to private branch exchange lines until all the lines in a private branch exchange group have been tested.

9. A testing circuit arrangement as claimed in claim 1 wherein each switching circuit is constiuted by a bi-stable electronic circuit.

10. A testing circuit arrangement as claimed in claim 7 in which said priming circuit is a bistable electronic circuit.

References Cited in the file of this patent

UNITED STATES PATENTS

| | | |
|---|---|---|
| 2,692,917 | Mauge | Oct. 26, 1954 |
| 2,697,752 | Buchner | Dec. 21, 1954 |
| 2,876,285 | Bjornson et al. | Mar. 3, 1959 |
| 2,902,642 | Voegtlen | Sept. 1, 1959 |
| 2,921,234 | Henquet | Jan. 12, 1960 |
| 2,972,683 | Lunney | Feb. 21, 1961 |

FOREIGN PATENTS

| | | |
|---|---|---|
| 817,547 | Great Britain | July 29, 1959 |

UNITED STATES PATENT OFFICE
CERTIFICATE OF CORRECTION

Patent No. 3,119,902 January 28, 1964

Bloomfield James Warman et al.

It is hereby certified that error appears in the above numbered patent requiring correction and that the said Letters Patent should read as corrected below.

In the grant, lines 3 and 4, and line 13, and in the heading to the printed specification, lines 5 and 6, for "Associated Electrical Industries (Woolrich) Limited" read -- Associated Electrical Industries (Woolwich) Limited --.

Signed and sealed this 23rd day of June 1964.

(SEAL)
Attest:

ERNEST W. SWIDER
Attesting Officer

EDWARD J. BRENNER
Commissioner of Patents